US 6,587,901 B2

(12) United States Patent
Nishikawa et al.

(10) Patent No.: US 6,587,901 B2
(45) Date of Patent: Jul. 1, 2003

(54) INFORMATION PROCESSING SYSTEM, PORTABLE ELECTRONIC EQUIPMENT AND INFORMATION PROCESSING APPARATUS

(75) Inventors: Naohiro Nishikawa, Tachikawa (JP); Yukako Fujita, Tokyo (JP); Takashi Nakamoto, Tama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/987,533

(22) Filed: Nov. 15, 2001

(65) Prior Publication Data

US 2002/0062413 A1 May 23, 2002

(30) Foreign Application Priority Data

Nov. 17, 2000 (JP) ......................... 2000-351629

(51) Int. Cl.[7] .................. G06F 13/00; G06F 15/177
(52) U.S. Cl. .................. 710/100; 710/305; 710/307; 710/300
(58) Field of Search .................. 710/100, 104, 710/300, 302–304, 305, 307; 713/2, 300; 709/200, 203, 217–219, 227; 714/23; 700/2, 5; 708/100; 361/683, 686; 345/537; 711/100

(56) References Cited

U.S. PATENT DOCUMENTS 5,265,238 A * 11/1993 Canova, Jr. et al.
5,506,396 A * 4/1996 Asami
5,668,977 A * 9/1997 Swanstrom et al.
5,721,835 A * 2/1998 Niwa et al.

* cited by examiner

Primary Examiner—Gopal C. Ray
(74) Attorney, Agent, or Firm—Mattingly, Stanger & Malur, P.C.

(57) ABSTRACT

The information processing system is configured such that a portable information terminal and host information processing apparatus can connect via a bus. A program executed by a CPU of the portable information terminal is sent from the host information processing apparatus on the bus to the portable information terminal for storage in a volatile memory. Thus, the portable information terminal does not need a non-volatile memory.

17 Claims, 11 Drawing Sheets

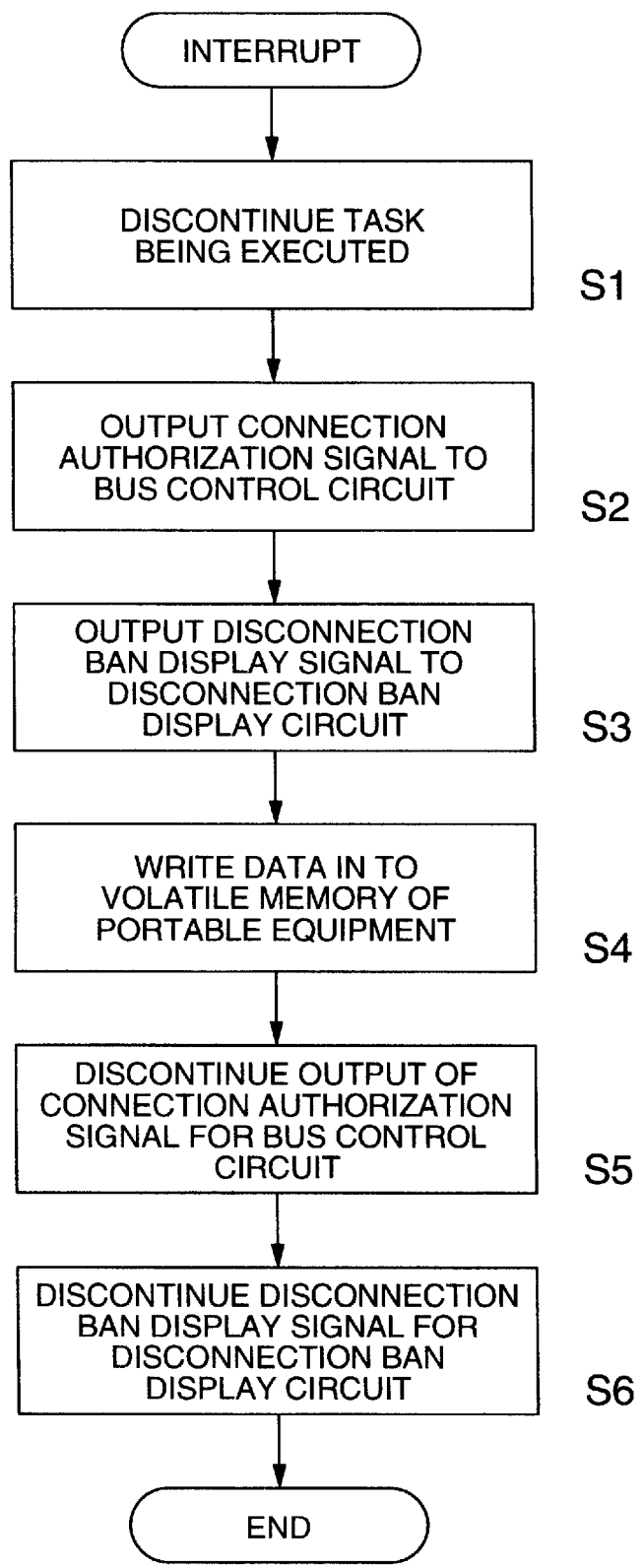

INFORMATION PROCESSING SYSTEM, PORTABLE ELECTRONIC EQUIPMENT AND INFORMATION PROCESSING APPARATUS

BACKGROUND OF THE INVENTION

This invention relates to an effective technology concerning a format for forwarding data to portable electronic equipment housing a microcomputer and further, a format for loading an application program of portable electronic equipment, which can be used for example for an MP3 player for playing audio data compressed in compliance with standards like MPEG 1 layer III, a portable information terminal or game equipment.

Portable electronic equipment like an MP 3 player, a portable information terminal or game equipment for example, houses a microcomputer (including what would be called a microprocessor). A variety of functionalities are realized through controlling a program of this microcomputer. Further, among such electronic equipment are types of equipment which realize multifaceted functionalities through housing multiple programs or through being able to have programs changed.

Normally, a portable information terminal is configured for connection to a stationary host information processing apparatus like a personal computer (hereinafter "PC") enabling exchange of information and usually, such a portable information terminal can be used by being carried separately after being detached from a host information processing apparatus once data has been conveyed from the host information processing apparatus to the portable information terminal and stored therein.

FIG. 11 shows a configuration of a portable information terminal having such function, proposed by the present inventors and not known herebefore. Numeral 100 in that drawing represents a portable information terminal and 200 represents a host information processing apparatus, the apparatuses including transmission/reception sections 105 and 205 for data transfer by serial transfer via cable 300, respectively.

Microcomputer (hereinafter "CPU") 101, non-volatile memory 102 like mask ROM (Read Only Memory) or flash memory, volatile memory 103 like RAM (Random Access Memory) and peripheral device 104 like an LCD controller controlling display of a liquid crystal panel may be included in portable information terminal 100. Non-volatile memory 102 is not rewritable, however because contents stored therein are not deleted when there is no power being supplied, a program like an OS (operating system) run by CPU 101 stored in non-volatile memory 102 is run by CPU 101 from the initial state immediately after power input.

When conveying data from host information processing apparatus 200 to portable information terminal 100, a connection like cable 300 is made between them and data can be sent and received through their respective transmission/reception sections 105 and 205 in conformance with a transmission interface like RS-232C (Recommended Standard 232C interface standard), USB (Universal Serial Bus interface standard), IEEE1394 (interface standard) IrDA (an interface standard of the Infrared Data Association). Data delivered to portable information terminal 100 is stored in volatile memory 103.

Non-volatile memory 102 for program storage is required for a conventional portable information terminal 100 described above in addition to volatile memory 103 for data storage. Because with existing semiconductor production technology the price of non-volatile memory like flash memory is relatively high in comparison to volatile memory like DRAM the cost of a system utilizing non-volatile memory is high. Further the number of parts increases if non-volatile memory is necessary in addition to volatile memory, and the system mounting space required increases. This creates a problem in dealing with a number of factors which mitigate against realizing small size and lightweight.

SUMMARY OF THE INVENTION

An object of this invention is to provide a portable information terminal the cost of which can be lower.

An other object of this invention is to provide a portable information terminal which can be smaller and lighter.

Another object of this invention is to provide a portable information terminal for which the time required on a production and/or assembly line can be reduced.

The above and further objects and features of the invention will more fully be apparent from the following detailed description with accompanying drawings.

Hereunder is a description of various aspects of the invention as disclosed in this application.

According to a first aspect of this invention, in addition to doing away with non-volatile memory of a portable information terminal, the configuration is such that a portable information terminal and host information processing apparatus can connect via a bus and a program executed by a CPU of the portable information terminal is sent from a host information processing apparatus on the bus to the portable information terminal for storage in volatile memory.

More specifically, the present invention provides an information processing system comprising:

portable electronic equipment including a first microcomputer, a first volatile memory, a first bus connecting the first microcomputer and volatile memory and a first bus connection means for connecting the first bus to a bus of an external device; and an information processing apparatus including a second microcomputer, a second volatile memory, a non-volatile memory, a second bus connecting the second microcomputer, a second volatile memory and a non-volatile memory and a second bus connection means for connecting the second bus to a bus of another external device;

wherein the portable electronic equipment is provided with a bus disconnection means enabling disconnection of the connection between the second microcomputer and the second bus so that when there is a connection through the first and second bus connection means between the first bus of the information processing apparatus and the second bus of the portable electronic equipment, the microcomputer and the bus is disconnected by the bus disconnection means.

Accordingly, the microcomputer of the information processing apparatus is able to access the volatile memory of the portable electronic equipment via the connected bus, rendering a transmission means unnecessary and enabling cost reductions while data transfer from the information processing apparatus to the portable electronic equipment becomes faster. Further, because there is no non-volatile memory for the portable electronic equipment substantial cost reductions for the portable electronic equipment are enabled and equipment can be smaller and lighter.

It is desirable that connection detection means is further provided for said information processing apparatus for detecting connection between the information processing apparatus and the portable electronic equipment and the configuration is such that, based on detection signals output from the connection detection means, the second bus connection means of the information processing apparatus and the first bus connection means of the portable electronic equipment are activated for mutual connection of the second and first buses.

The system is configured such that the bus disconnection means disconnects the connection between the first microcomputer of the portable electronic equipment and the first bus based on the detection signals output from the connection detection means.

According to another aspect of this invention, a connection detection means is further provided for each of the information processing apparatus and the portable electronic equipment for detecting connection between the information processing apparatus and the portable electronic equipment, and the configuration is such that based on detection signals output from these connection detection means, the second bus connection means of the information processing apparatus and the first bus connection means of the portable electronic equipment are each activated for mutual connection of the second and first buses. This makes it unnecessary to deliver a signal controlling the bus connection means from the information processing apparatus to the portable electronic equipment, enabling a reduction in the number of transmission lines.

According to another aspect of this invention, a power on reset circuit for detecting startup of power voltage input and generating a reset signal is further provided for the portable electronic equipment, the configuration being such that, when a connection between the information processing apparatus and portable electronic equipment is cut, a reset signal is generated from the power on reset circuit and the first microcomputer of the portable electronic equipment is reset through that reset signal. This avoids the microcomputer of the portable electronic equipment hanging up after a connection between the information processing apparatus and portable electronic equipment is disconnected.

According to another aspect of this invention, when the information processing apparatus and the portable electronic equipment are connected, at least a boot program of the portable electronic equipment is transmitted via the first and second buses from the information processing equipment to the first volatile memory of the portable electronic equipment and stored therein, and when the information processing apparatus and the portable electronic equipment are disconnected from each other, the first microcomputer of the portable electronic equipment is reset through a reset signal generated by the power on reset circuit so that the first microcomputer executes a boot program stored in the first volatile memory. Accordingly, in addition to obviating the necessity for non-volatile memory for storing a boot program of portable electronic equipment, normal control of internal parts of such equipment is enabled even without that kind of memory. Because processes at the production and/or assembly line for storing a boot program in non-volatile memory are thereby rendered unnecessary, it becomes possible to substantially reduce the time required for completion of a product.

According to another aspect of this invention, a second signal conversion circuit for converting a first signal on the second bus of the information processing apparatus into a second signal is further provided in the information processing apparatus, the second signal having a number of bits smaller than that of the first signal. This enables the number of signal lines connecting an information processing apparatus and portable electronic equipment to be reduced, a reduction in size of connectors enabling the size of a device itself to be reduced.

According to another aspect of this invention, the information processing apparatus is further provided with a means for display for making displays based on a detection signal output from the connection detection means. Through this, it becomes possible for a user to easily confirm that a connection from information processing equipment to portable electronic equipment must not be disconnected, thereby avoiding problems of portable electronic equipment being disconnected from information processing equipment during data transfer with data loss or a system hangup resulting subsequently.

BRIEF DESCRIPTION OF THE DRAWINGS

FIG. 5 is a flowchart showing a procedure when data is forwarded from a host information processing apparatus to portable information terminal equipment according to an embodiment of the present invention.

DESCRIPTION OF THE EMBODIMENTS

Specific embodiments of the present invention will now be described with reference to the drawings.

Figure 1:
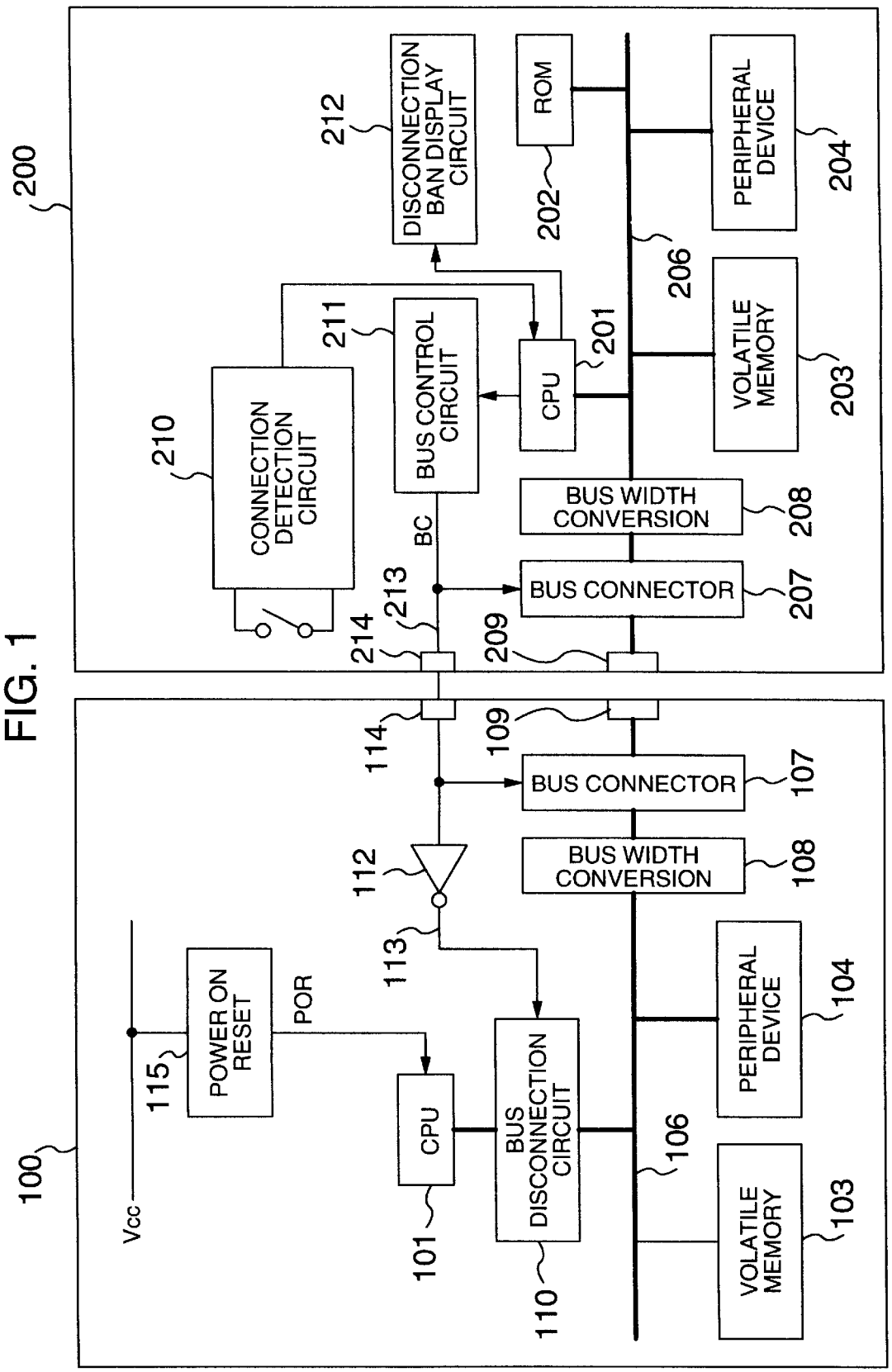
FIG. 1 is a block diagram showing a portable information terminal and host information processing apparatus according to an embodiment of the present invention.

FIG. 1 shows a portable information terminal and a host information processing apparatus according to an embodiment of the present invention. Numeral 100 in that drawing represents a portable information terminal and 200 represents a host information processing apparatus.

CPU (microcomputer or microprocessor) 101, volatile memory 103 like static RAM or dynamic RAM and peripheral device 104 like an LCD controller controlling display of a liquid crystal panel connected by internal bus 106 are provided in a portable information terminal 100. CPU 201, non-volatile memory 202 like mask ROM, volatile memory 203 like static RAM or dynamic RAM and peripheral devices 204 like a magnetic disk controller for controlling a magnetic storage device like a hard disk, or a display controller for controlling display of a CRT display device or liquid crystal panel are mutually connected by internal bus 206 provided in host information processing apparatus 200.

In this embodiment, for a connection between the portable information terminal 100 and host information processing apparatus 200 enabling data transmission, bus connection circuits 107 and 207 are provided for the terminals of buses 106 and 206 respectively, while bus width conversion circuits 108 and 208 are provided along buses 106 and 206 respectively. Bus connection circuits 107 and 207 are each connected to their respective bus connection connectors 109 and 209. These connectors 109 and 209 are configured to enable their connection and it is suitable for them to be connected indirectly via a cable, or to be connectors coupled or joined together for a direct connection.

The signals transmitted from buses 106 and 206 are address signals, data signals and readout/write control signals. In this embodiment of this invention, address signals and read/write control signals from among these signal types can be transmitted from host information processing apparatus 200 to portable information terminal 100 while data signals are capable of transmission in both directions.

Bus width conversion circuits 108 and 208 are circuits for reducing the number of signal lines between bus connection circuits 107 and 207. The internal buses 106 and 206 are for example using 32-bit data, and bus width conversion circuits 108 and 208 convert signals to enable data transmission between bus connection circuits 107 and 207 with 16-bit data. These circuits 108 and 208 are not absolutely indispensable and can be left out. Further, as described subsequently, there is a configuration where only bus conversion circuit 108 of the portable information terminal 100 side is left out.

Further in this embodiment, between CPU 101 of portable information transmission device 100 and bus 106, bus disconnection circuit 110 is provided for connecting and disconnecting CPU 101 and bus 106. In host information processing apparatus 200 are provided connection detection circuit 210 for detecting connections between connectors 109 and 209, bus control circuit 211 for generating signal BC for controlling bus connection circuits 107 and 108 and bus disconnection circuit 110, based on detection signals of this connection detection circuit 210, as well as disconnection ban display circuit 212 for displaying a ban ensuring there is no bus disconnection while data is being transmitted via bus 106. This display circuit 212 can also be seen as a circuit for notifying data transmission completion when transmission of data has finished.

Signal lines 113 and 213 for supplying bus control signal BC output from bus control circuit 211 of host information processing apparatus 200 to portable information terminal 100 as well as connectors 114 and 214 for connecting these signals are provided for the portable information terminal 100 and host information processing apparatus 200 respectively. These connectors 114 and 214 however, can be configured as one integrated whole with bus connection connectors 109 and 209 respectively. Inverter 112 for inverting bus control signal BC supplied by signal lines 113 and 213 is provided in portable information terminal 100. Signals converted by this inverter 112 are supplied for signals controlling bus disconnection circuit 110, the configuration allowing connection and disconnection for CPU 101 and bus 106.

Figure 6:
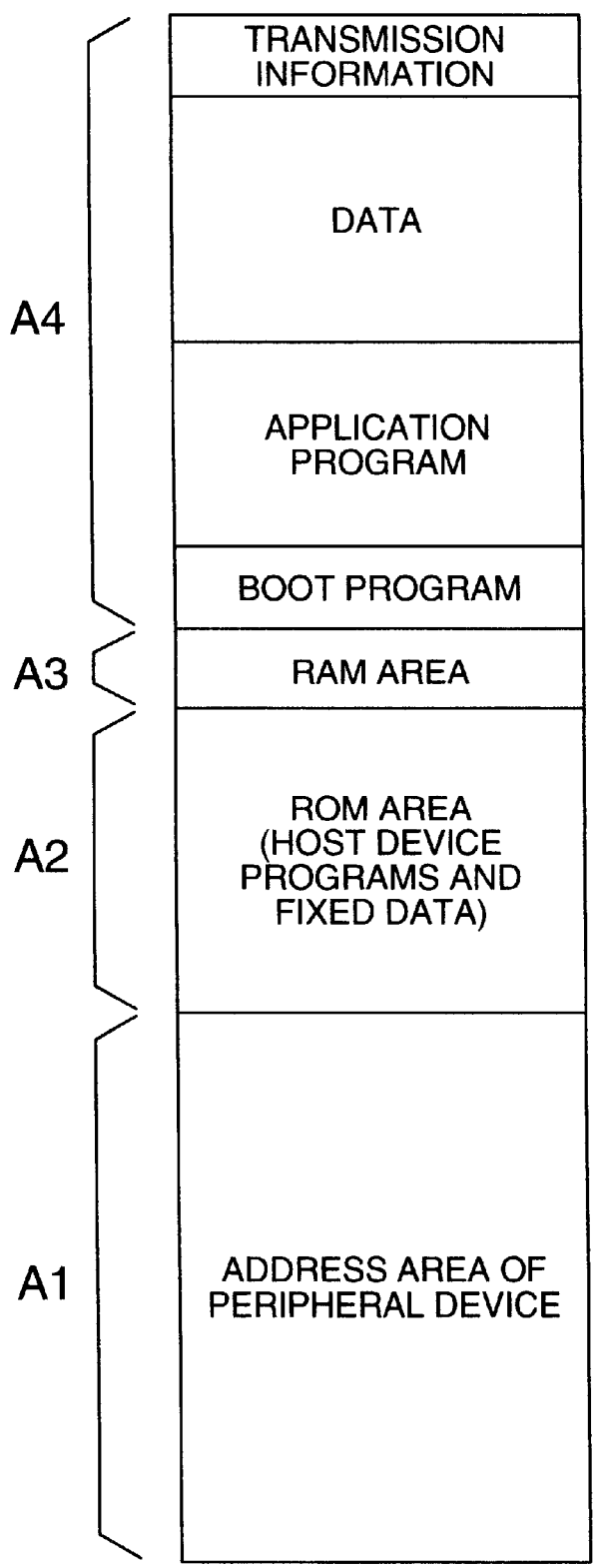
FIG. 6 is an explanatory drawing showing an example of configuration of address space for a CPU of the host information processing apparatus side according to an embodiment of the present invention.

This configuration allows for volatile memory 103 of portable information terminal 100 to operate as a peripheral circuit of CPU 201 when that volatile memory 103 is connected to CPU 201 of host information processing apparatus 200 via buses 106 and 206. That is to say, in addition to memory 103 data being arranged in address space of CPU 101, as shown in FIG. 6, it is also possible to arrange memory 103 in address space of CPU 201. When volatile memory 103 is connected to CPU 201 address allocation of volatile memory 103 is set so that there is no overlapping with address space of volatile memory 203 of the host information processing apparatus 200 side or ROM 202.

In FIG. 6, A1 represents an address area of a peripheral device like a hard disk for storing data transmitted to portable information terminal 100, A2 represents an address area of ROM 202 housing fixed data or a program run by CPU 201 of host information processing apparatus 200, A3 is an address area of RAM 203 providing a work area of CPU 201 and A5 is an address area of volatile memory 103 of portable information terminal 100 when host information processing apparatus 200 is connected. Things like data and/or application programs such as for music data, boot program(s) and transmission information are stored in this address area A4. Transmission information here means information showing information having been transmitted to volatile memory 103 so that CPU 201 can refer to this transmission information and leave out transmission of duplicated data.

In this embodiment, power on reset circuit 115 for detecting startup of power voltage and generating power on reset signal POR is provided in portable information terminal 100, the configuration being such that CPU 101 jumps to a specified address of volatile memory 103 for example, when CPU 101 is reset through such a power on reset signal POR. Although not shown in the drawings the same kind of power on reset circuit is provided for host information processing apparatus 200 also.

In the embodiment shown in FIG. 1 bus disconnection circuit 110 for disconnecting connections between the CPU and bus is between CPU 101 and bus 106, but when CPU 101 is the kind of CPU that in response to a control signal from outside puts an address output terminal or data input output terminal into a high impedance state, opening the bus, and has a mode entered like a static state sleep mode, a configuration can be made wherein the above bus control signal BC or inverted signal /BC are input in an external control terminal of a CPU for transition to the above state or mode. This enables bus disconnection circuit 110 to be dispensed with.

Although not shown in FIG. 1, a display device like an LCD panel and an input operation device like an operating button for giving instructions from an external source are connected to the CPU of portable information terminal 100 and host information processing terminal 200 respectively.

Figure 2A:
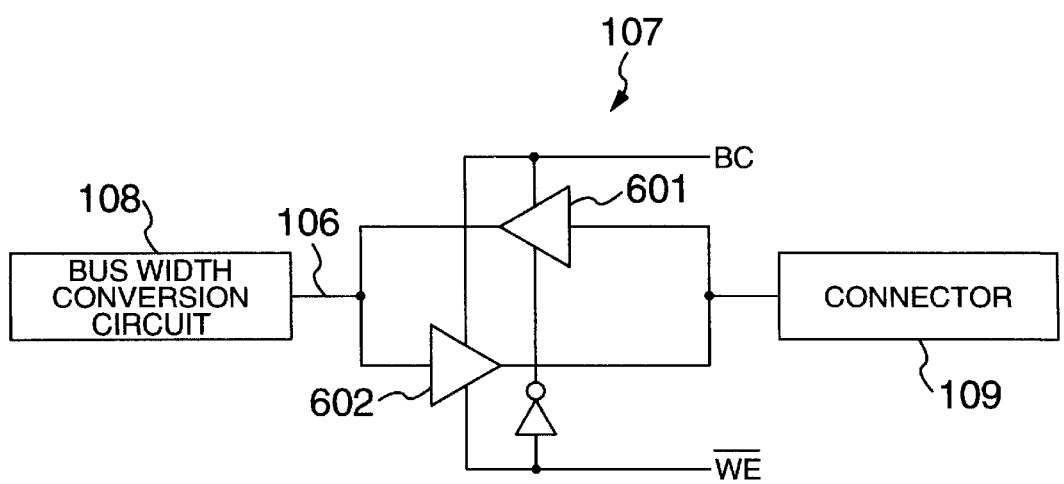
FIGS. 2A and 2B are drawings of circuit configurations for examples of the configuration of a bus connection circuit according to an embodiment of the present invention.
Figure 2B:
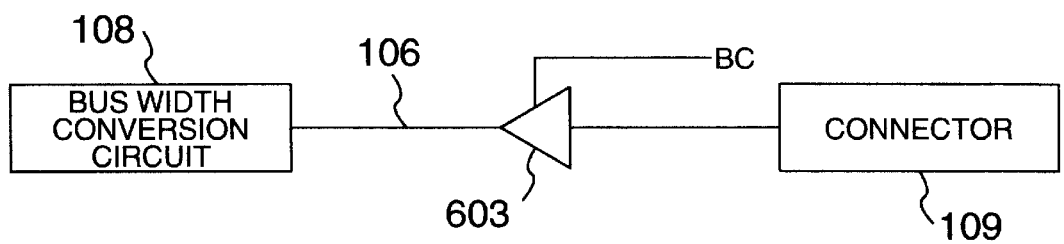

FIGS. 2A and 2B are drawings of circuit configurations for examples of the configuration of bus connection circuit 107. FIG. 2A shows a connection circuit for data signals formed of the bus control signal BC controlled tri-state input buffer 601 and tri-state output buffer 602. FIG. 2B shows a connection circuit for address signals and readout/write control signals formed of input buffer 603 controlled through bus control signal BC. Buffer 603 need not be tri-state.

Either one of input buffer 601 or output buffer 602 for data signals as shown in FIG. 2A is activated through write-enable signals /WE, read/write control signals taken in by input buffer 603 of FIG. 2B. Specifically, when write-enable signal /WE is for low level write instructions input buffer 601 is activated and when write-enable signal /WE is for high level readout instructions output buffer 602 is activated.

As a data signal circuit the circuit shown in FIG. 2A displays a circuit capable of bi-directional data transmission through input buffer 601 and output buffer 602, however as the requirement is capability of writing-in data from host information processing apparatus 200 to volatile memory 103 of portable information terminal 100, providing at least input buffer 601 is viable. Providing output buffer 602 in addition to input buffer 601 enables verifying operations to check whether CPU 201 of host information processing apparatus 200 has written data into volatile power memory 103 of portable information terminal 100 correctly or not.

Although not shown in FIGS. 2A and 2B, bus connection circuit 207 of the host information processing apparatus 200 side is formed in the same way as the bus connection circuit shown in FIGS. 2A and 2B. Unlike bus connection circuit 107 of portable information terminal 100, bus connection circuit 207 of the host information processing apparatus 200 side has, instead of an input buffer for address signals and write-enable signals, an output buffer and in the opposite way as applies for bus connection circuit 107 of portable information terminal 100, providing at least an output buffer for data signals is viable and a data input buffer may be dispensed with.

Figure 3A:
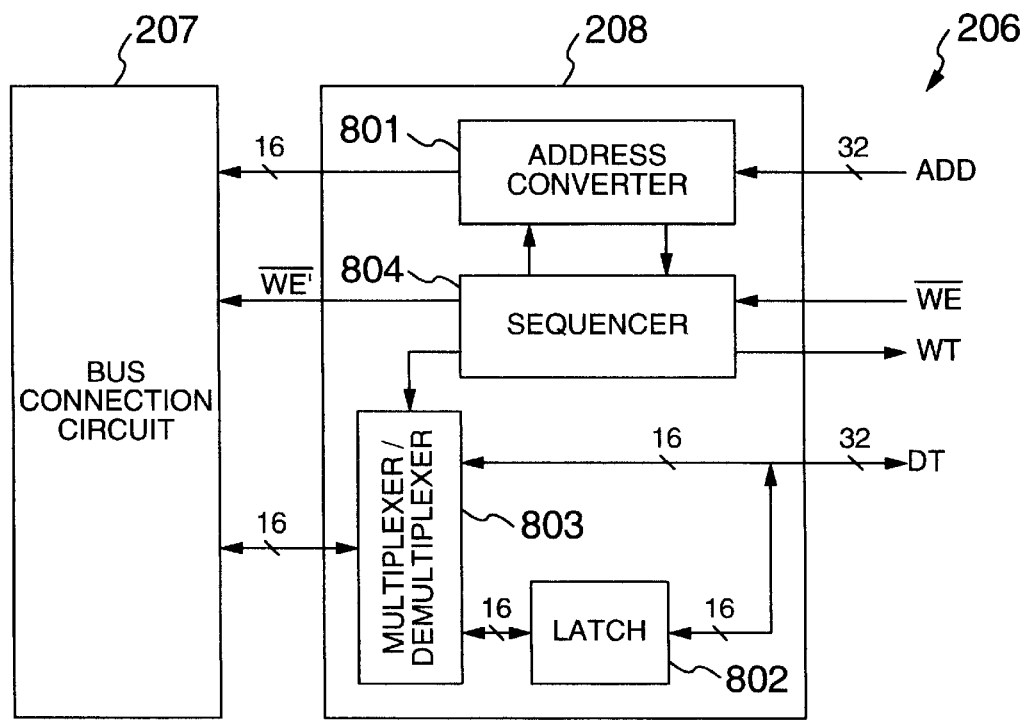
FIGS. 3A and 3B are drawings of circuit configurations for examples of a bus width conversion circuit according to an embodiment of the present invention.
Figure 3B:
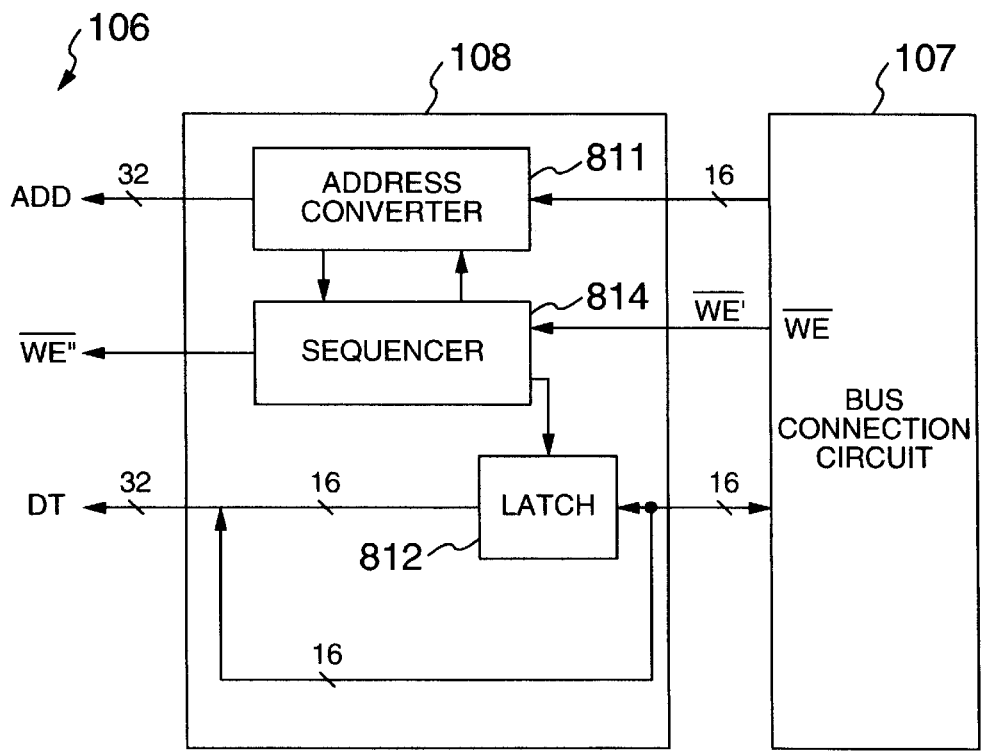

An example of bus width conversion circuit 208 of the host information processing apparatus 200 side is shown in FIG. 3A while an example of bus width conversion circuit 108 of the portable information terminal 100 side is shown in FIG. 3B.

Bus width conversion circuit 208 of the host information processing apparatus 200 side as shown in FIG. 3A includes address converter 801 for converting for example 32-bit address signal ADD from CPU 201 output by bus 206 into a 16-bit address signal for output, latch circuit 802 capable of latching low-order 16-bit data from among the 32-bit data signal DT for example output by bus 206, multiplexer/demultiplexer 803 for selecting for output between either of 16-bit data latched by this latch circuit 802 or low-order 16-bit data on bus 206, and sequencer 804 for controlling address converter 801 and multiplexer/demultiplexer 803 and for generating write-enable signal /WE' suitable for the portable information terminal 100 side, based on write-enable signal /WE output from CPU 201.

As data is written in from CPU 201 to volatile memory 103, multiplexer/demultiplexer 803 first outputs low-order 16-bit data on bus 206 before outputting low-order 16-bit data of latch circuit 802. When multiplexer/demultiplexer 803 is performing these operations, sequencer 804 sends wait signal WT to CPU 201 ensuring the next address is not output until low-order 16-bit data of latch circuit 802 is output.

Further, as CPU 201 is reading in data from volatile memory 103, multiplexer/demultiplexer 803 first supplies 16-bit data sent from the portable information terminal 100 side to latch circuit 802 for latching, while the next 16-bit data is output directly to the low-order side of bus 206. As multiplexor/demultiplexer 803 is performing these operations, sequencer 804 sends wait signal WT to CPU 201 ensuring that data on bus 206 is not taken in until 32-bit data processes are complete.

Address converter 801 is made able to perform address conversion so that from among address signals like 32-bit signals on bus 206 for example, high-order 16-bit signals are not output and only low-order address signals are output. Generally, address space of CPU 201 of the host information processing apparatus 200 side would be expected to be bigger than address space of CPU 101 of the portable information terminal 100, so that if access is possible to volatile memory 103 of the portable information terminal 100 side with only content of the address signals as described. Address conversion is not restricted to converting 32-bit data to 16-bit data and any kind of conversion wherein there is a change to a lower number of bits is viable. In the same way as for data, through a latch circuit or multiplexer, addresses for 32-bit data can be divided into 16-bit data twice for time-shared output.

FIG. 3B is an example of a configuration of bus bandwidth conversion circuit 108 of portable information terminal 100 when addresses and number of data bits of portable information terminal 100 are the same as addresses and number of data bits of host information processing apparatus 200.

Bus bandwidth conversion circuit 108 of the portable information terminal 100 side includes address converter 811 for converting a 16-bit address signal supplied via bus connection circuit 107 from the host information processing apparatus 200 side back into a 32-bit address signal ADD, latch circuit 812 capable of latching 16-bit data signals from the host information processing apparatus 200 side, and sequencer 814 for controlling this latch circuit 812 and address converter 811 and generating write-enable signals /WE" for volatile memory 103 based on write-enable signals /WE' supplied from the host information processing apparatus 200 side when a 32-bit data signal DT is formed from 16-bit data input following latch operations of latch circuit 812.

Where address signals for input are, like data, to be divided into 16-bit data twice for time-shared input, address converter 811 is controlled to synthesize the two address signals of 16-bit data that is configured through a latch circuit and consecutively input, and convert that to a 32-bit address signal for output. Where the address bus width of bus 106 of the portable information terminal 100 side is 16-bit, address converter 811 is dispensable. Similarly, if the data bus width of bus 106 of the portable information terminal 100 side is 16-bit, latch circuit 812 is unnecessary. Accordingly, as both data signals and address signals supplied from the host information processing 200 are 16-bit, when the address bus of the portable information terminal 100 side and the bus width of the data bus are both 16-bit, bus conversion circuit 108 itself becomes unnecessary.

Figure 4A:
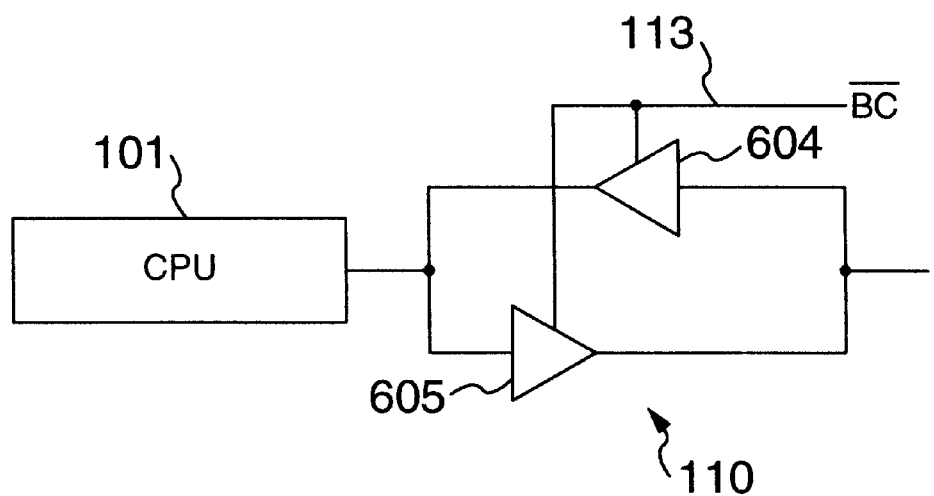
FIGS. 4A and 4B are drawings of circuit configurations for examples of a bus disconnection circuit according to an embodiment of the present invention.
Figure 4B:
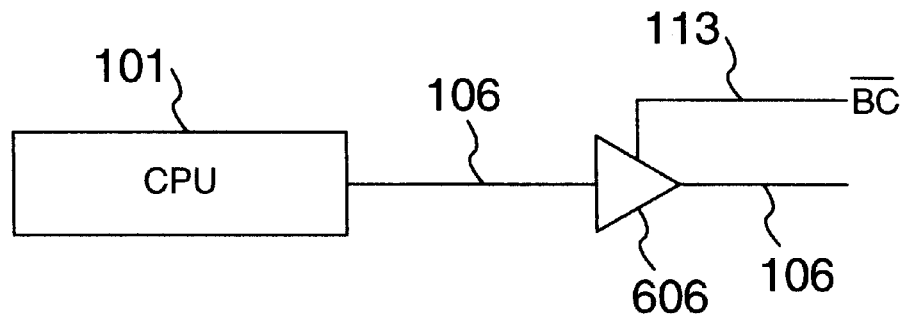

FIGS. 4A and 4B show a specific example of bus disconnection circuit 110 for disconnecting bus 106 and CPU 101 as shown in FIG. 1. FIG. 4A shows a disconnection circuit for data signals comprised of input buffers 604 and output buffers 605 controlled through inverted signal /BC of bus control signal BC. FIG. 4B shows a disconnection circuit for address signals and read/write control signals comprised of output buffers 606 controlled through inverted signal /BC of bus control signal BC Buffers 604 and 605 for input and output of data signals respectively shown in FIG. 4A as well as buffer 606 for address signal output shown in FIG. 4B are arranged such that they are made inactive to disconnect CPU 101 from bus 106 when bus control signal /BC is at a low level with host information processing apparatus 200 and portable information terminal 100 being connected to each other, and are made active to connect CPU 101 to bus 106 when bus control signal /BC is at a high level with host information processing apparatus 200 being disconnected from portable information terminal 100.

Next, a procedure for the above embodiment occurring when data is transferred from host information processing apparatus 200 to portable information terminal 100 will be described with reference to the flowchart in FIG. 5. FIG. 5 shows the control flow of the CPU of host information processing apparatus 200 when that is connected to portable information terminal 100.

As host information processing apparatus 200 is connected to portable information terminal 100 through the joining of connectors 109 and 209, and connectors 114 and 214, that connection is detected by connection detection circuit 210 and a detection signal is supplied to CPU 201 as an interrupt signal and the control flow shown in FIG. 5 starts.

As that control flow starts, CPU 201 discontinues any task it is currently executing (step S1) and outputs a connection authorization signal to bus control circuit 211 (step S2). Thereafter, bus control signal BC output from bus control circuit 211 is converted to an effective level like a high-level and supplied to bus connection circuit 207 of host information processing apparatus 200 and bus connection circuit 107 of portable information terminal 100 and buses 106 and 206 are connected. In addition to this, bus control signal BC is inverted by inverter 112 and supplied to bus disconnection circuit 110, while CPU 101 is disconnected from bus 106. Therefore, volatile memory 103 in portable information terminal 100 is connected to CPU 201 of host information processing apparatus 200 via buses 106 and 206; that volatile memory 103 being able to operate as a peripheral circuit of CPU 201 and entering a state in which memory 103 receives addresses supplied from CPU 201 and can read/write data.

Next, CPU 201 outputs a disconnection ban display signal to disconnection ban display circuit 212 (step S3). As this ban display signal is output, a lamp of disconnection ban display circuit 212 (not shown in the drawing) flashes a display appearing in the display circuit cautioning against disconnection. Through such display, a user is able to recognize that the system is in a condition wherein the connection between host information processing apparatus 200 and portable information terminal 100 may not be disconnected. The order of this step S3 for outputting a disconnection ban display and the step S2 outputting authorization for bus connection may be reversed.

As a disconnection ban is displayed CPU 201 transfers data to volatile memory 103 of portable information terminal 100 (step S4). Specifically, CPU 201 outputs address signals on bus 206 and reads out data (for example an application program of portable information terminal 100) wanted for transfer from ROM 202 of host information processing apparatus 200, volatile memory 203 or peripheral device (hard disk) 204, to portable information terminal 100 and writes this data in to volatile memory 103 of portable information terminal 100 via bus 206. This can be performed by DMA transfer through the DMA controller provided inside CPU 201 at times when a large volume of data is being transferred. In this embodiment data transferred from host information processing apparatus 200 to portable information terminal 100 may include input program(s) for portable information terminal 100 and the required boot program(s) would be stored from specified addresses in volatile memory 103.

When data transfer is completed, CPU 201 discontinues output of a connection authorization signal to bus control circuit 211 (step S5). Once this is done, bus control signal BC output from bus control circuit 211 is changed to an invalid level like low level, bus connection circuit 207 of host information processing apparatus 200 and bus connection circuit 107 of the portable information terminal 100 are in an isolated state and buses 106 and 206 are disconnected. Additionally, bus connection circuit 110 is changed over for connection between CPU 101 is connected to bus 106.

When bus disconnection has been effected, CPU 201 discontinues output of the disconnection ban display signal to disconnection ban display circuit 212 (step S6). Once this is done, disconnection ban display circuit 212 discontinues flashing of the display lamp (not shown in the drawings) or discontinues output of the ban message. This enables a user to confirm whether in the present condition it is permissible to disconnect host information processing apparatus 200 and portable information terminal 100. Thereafter, if host information processing apparatus 200 and portable information terminal 100 are physically disconnected, portable information terminal 100 commences an operation with power voltage from its own battery, at which point power on reset circuit 115 detects startup of power voltage and generates power on reset signal POR. Through this power on reset signal POR CPU 101 is reset and CPU 101 then jumps to process specified addresses of volatile memory 103 for example, executing the program stored there to startup.

Figure 7:
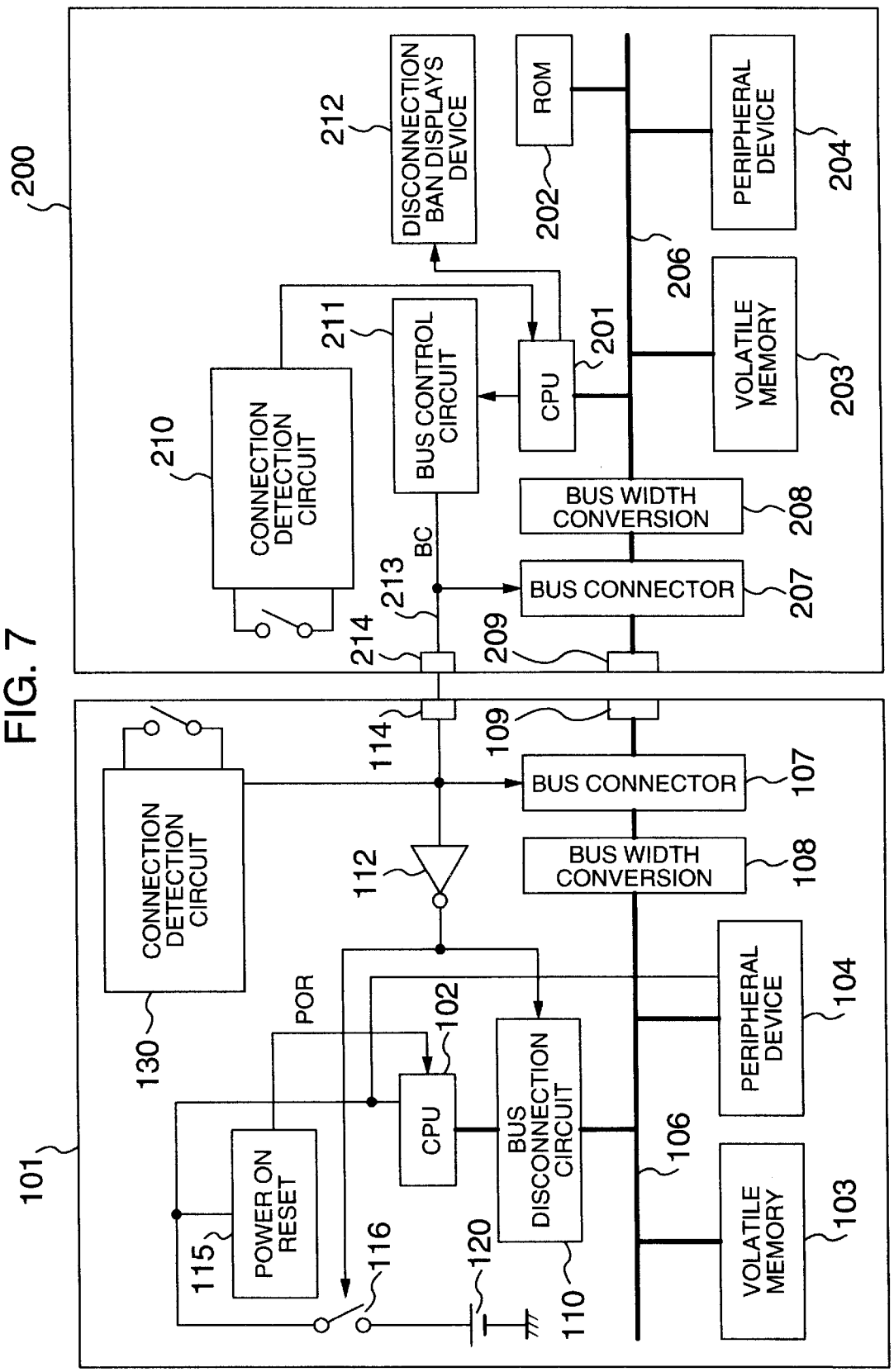
FIG. 7 is a block diagram showing a portable information terminal and host information processing apparatus according to an embodiment of the present invention.

FIG. 7 shows a portable information terminal and host information processing apparatus according to another embodiment of the present invention. In this embodiment, connection detection circuit 110 is provided for the portable information terminal 101 in the same way as connection detection circuit 210 provided for host information processing apparatus 200. Bus connection circuit 107 and detection connection circuit 110 perform switchovers based on detection signals from connection detection circuit 210. A point about this embodiment is that signal lines 113 and 213 for transmitting bus control signal BC from host information processing apparatus 200 to portable information terminal 100 as well as connectors 114 and 214 for connecting these signal lines, are unnecessary.

In this embodiment, switch 116 is provided for interrupting power voltage supplied from battery 120 to CPU 101 or peripheral device 104 for example based on detection signals of connection detection circuit 210, the configuration being such that as portable information terminal 100 is connected to host information processing apparatus 200 switch 116 goes to off, power being supplied to CPU 101 and peripheral device 104 is discontinued so consumption of voltage of battery 120 is kept down. In respect of for example volatile memory 103 or bus connection circuit 107 also, a configuration wherein switch 116 goes to off as portable information terminal 100 is connected to host information processing apparatus 200 so that power voltage from battery 120 is interrupted and operations are driven by power supplied from the host information processing apparatus 200 side is also suitable.

A configuration wherein if portable information terminal 101 is disconnected from host information processing apparatus 200 switch 116 goes to off based on detection signals from connection detection circuit 210 and in addition to power supply commencing to CPU 101 and peripheral device 104, power on reset circuit 115 detects the power voltage startup and generates power on reset signal POR, while CPU 101 resets in response to this power on reset signal POR is also suitable.

Figure 8:
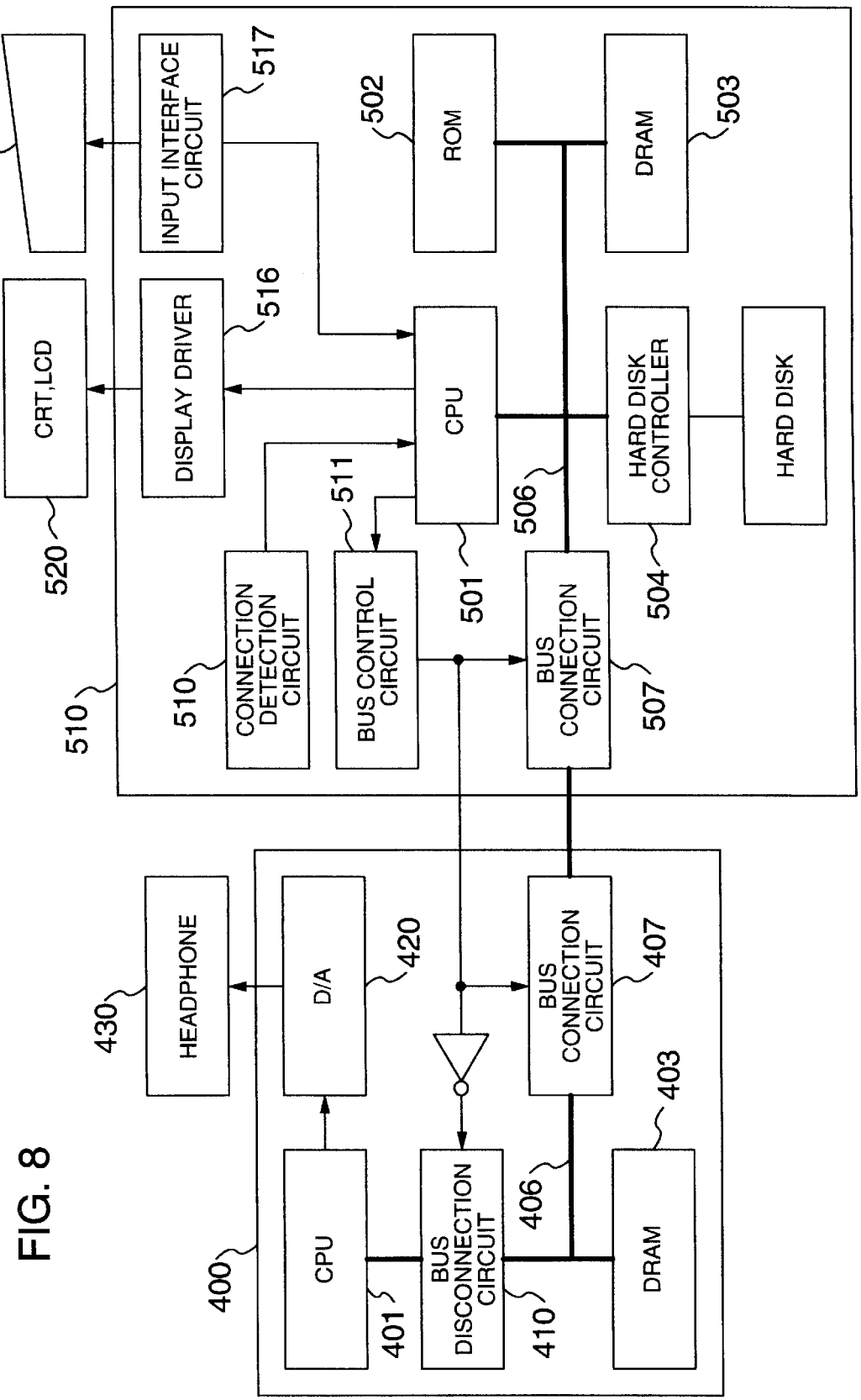
FIG. 8 is a block diagram showing a server operating as a portable music playing apparatus and host information processing apparatus according to an embodiment of the present invention.

FIG. 8 shows a portable music playing apparatus like an MP3 player. In FIG. 8, 400 represents a portable music playing apparatus and 500 is a server, being a host information processing apparatus for transmitting compressed music data and programs for decoding that to portable music playing apparatus 400.

In this embodiment portable music playing apparatus 400 is of a similar configuration to portable information terminal 100 shown in FIG. 1. That is to say, the apparatus 400 includes CPU 401, DRAM 502 for volatile memory and bus connection circuit 407 as well as bus disconnection circuit 410. The difference between this playing apparatus 400 and portable information terminal 100 of FIG. 1 is that there is no address conversion circuit provided for this playing apparatus and there is DA converter 420 provided which is not present in FIG. 1. DA converter 420 performs digital-analog conversion on PCM sound source data generated through extension processes of CPU 401, generates drive signals for headphone 430 and plays music.

Although not shown in FIG. 8, peripheral device 104 like an LCD driver, connector 109 and power on reset circuit 115 shown in FIG. 1 are also provided for this embodiment. The absence of an address conversion circuit is because this embodiment envisages that address space of CPU 401 of portable music playing apparatus 400 and address space of the CPU of the server are suited to a system of the same size. In the same way as for the embodiment shown in FIG. 1 however, an address conversion circuit may be provided. Further, provision of a circuit of the same kind as connection detection circuit 110 of the embodiment shown in FIG. 7 is also viable.

Server 500 of this embodiment has a structure similarly to host information processing apparatus 200 shown in FIG. 1. That is to say, server 500 includes CPU 501 and ROM 502, DRAM 503 for volatile memory, a peripheral device being hard disk controller 504, bus connection circuit 507, connection detection circuit 510 for detecting connection of portable music playing apparatus 400 and bus control circuit 511 for controlling bus connection circuits to 507 and 407 based on the detection signal of connection detection circuit 510.

Although not shown in FIG. 1, display driver 516 for driving display device 520 like a CRT display device or liquid crystal display (LCD) and interface circuit 517 for detecting input signals from input device 530 like a keyboard for example and inputting that to CPU 501 are provided for this embodiment. A disconnection ban display circuit although not shown in FIG. 8 is also provided for providing a ban display ensuring against bus disconnection while data is being transferred via a connector for connecting buses or a bus. Further, something like a CD driver for driving a CD (compact disc) storing data for music for example may also be provided.

For this embodiment, in addition to housing compressed music data (hereinafter "audio stream") that could be compressed in accordance with a variety of compression formats like MPEG-1 layer III for example, hard disk 540 of server 500 also houses an extension program compatible with each such compression format. In accordance with input instructions from keyboard 530 when server 500 is in a state of connection with portable music playing apparatus 400, a specified audio stream and a decoding program to open that stream are transmitted to portable music playing apparatus 400 and stored in DRAM 403.

Figure 9A:
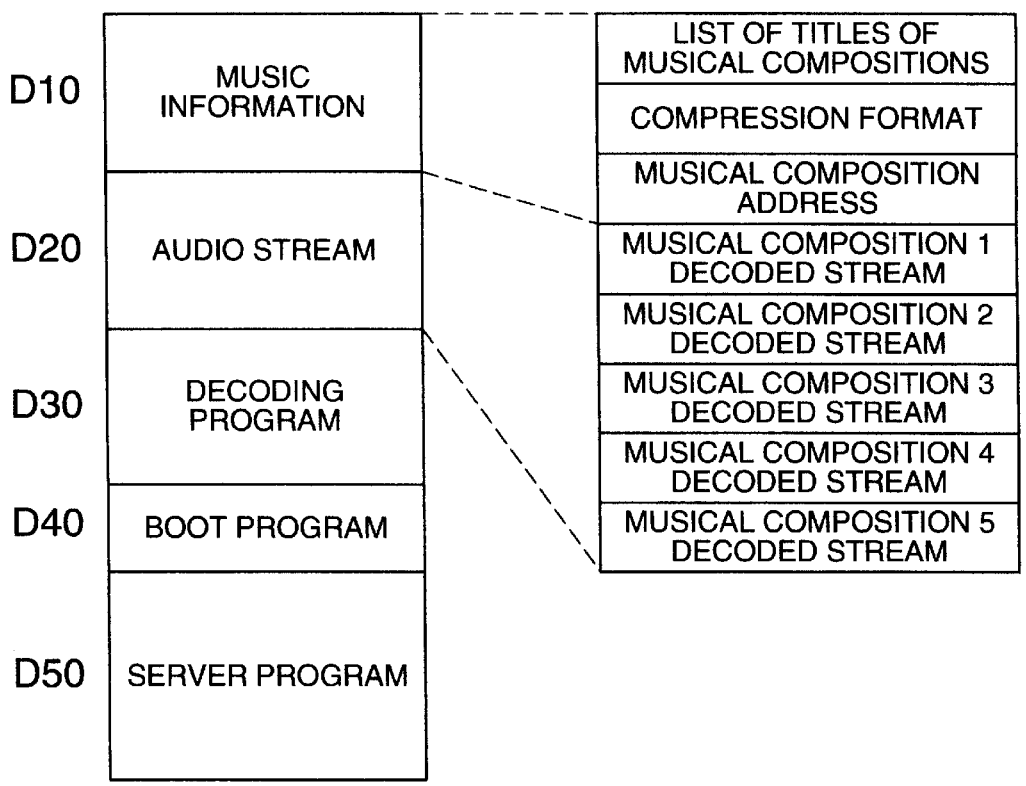
FIGS. 9A and 9B are diagrams of data configurations showing respectively the configuration of data stored in a hard disk of a host information processing apparatus and the configuration of data stored in DRAM of a portable music playing apparatus according to an embodiment of the present invention shown in FIG. 8.
Figure 9B:
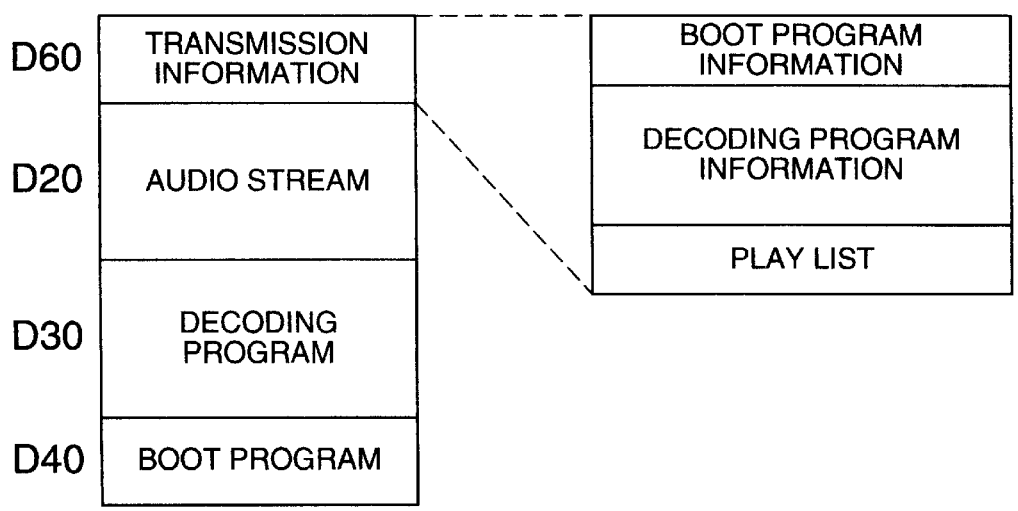

FIG. 9A shows a configuration of data stored in hard disk 540 of host information processing apparatus 500 and FIG. 9B shows a configuration of data stored in DRAM 403 of portable music playing apparatus 400.

In FIG. 9A, D10 represents all audio stream identification information, in other words, available titles of musical compositions and compression formats therefor as well as music information containing such things as information on the location (the address) where an audio stream is stored that are stored in hard disk 540, D20 represents audio streams, D30 represents decoding program(s), D40 boot program(s) of the CPU of portable music playing apparatus 400 and D50 program(s) for server 500. Of these, boot programs are definitely transmitted from server 500 to DRAM 403 of portable music playing apparatus 400 but only those of the decoding programs which are necessary for opening processes for transmitted audio data are selected for transmission.

As shown in FIG. 9B data stored in DRAM 403 of portable music playing apparatus 400 is information D60 concerning transmitted data, audio streams D20, decoding program(s) D30 and boot program(s) D40.

Transmission information D60 above includes boot program information showing whether or not boot program(s) transmission is complete, decoding program information showing transmitted decoding program(s) and a play list showing a list of transmitted audio streams. This transmission information D60 may be enabled for delivery to and storage in DRAM 403 of portable music playing apparatus 400, however storage within DRAM 503 or hard disk 540 of server 500 is also suitable. Program(s) D50 of server 500 include encoding program(s) for compression of audio data, while a configuration wherein server 500 possesses functionalities for encoding and compressing music data taken from a CD through a CD drive for example by decoding program(s) and then storing that music data in a hard disk is suitable.

A specific procedure for transmission of data from server 500 to DRAM 403 of portable music playing apparatus 400 will now be described with reference to the flowchart of FIG. 10.

Figure 10:
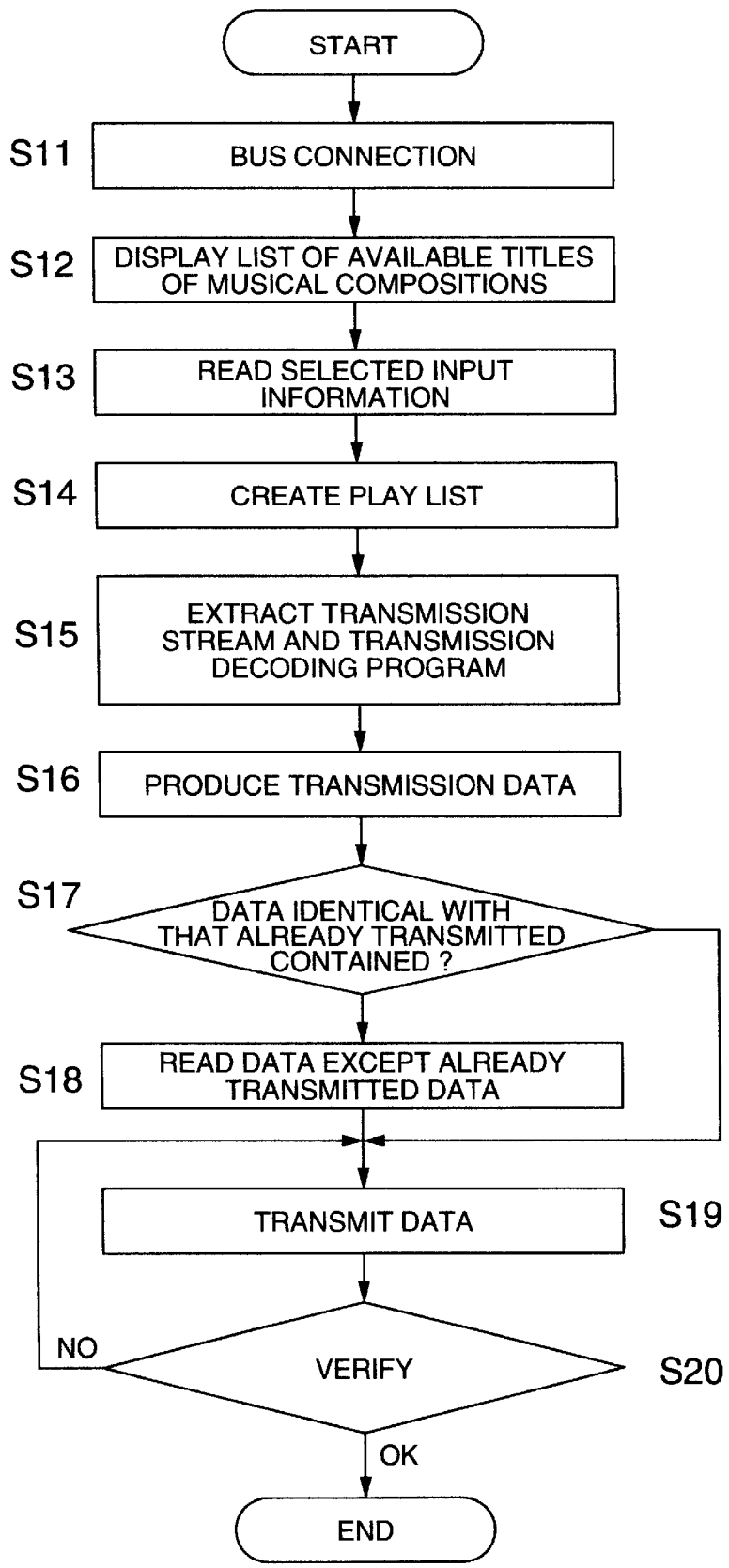
FIG. 10 is a flowchart showing a specific procedure for data forwarded from a server to DRAM of a portable music playing apparatus according to an embodiment of the present invention shown in FIG. 8.
Figure 11:
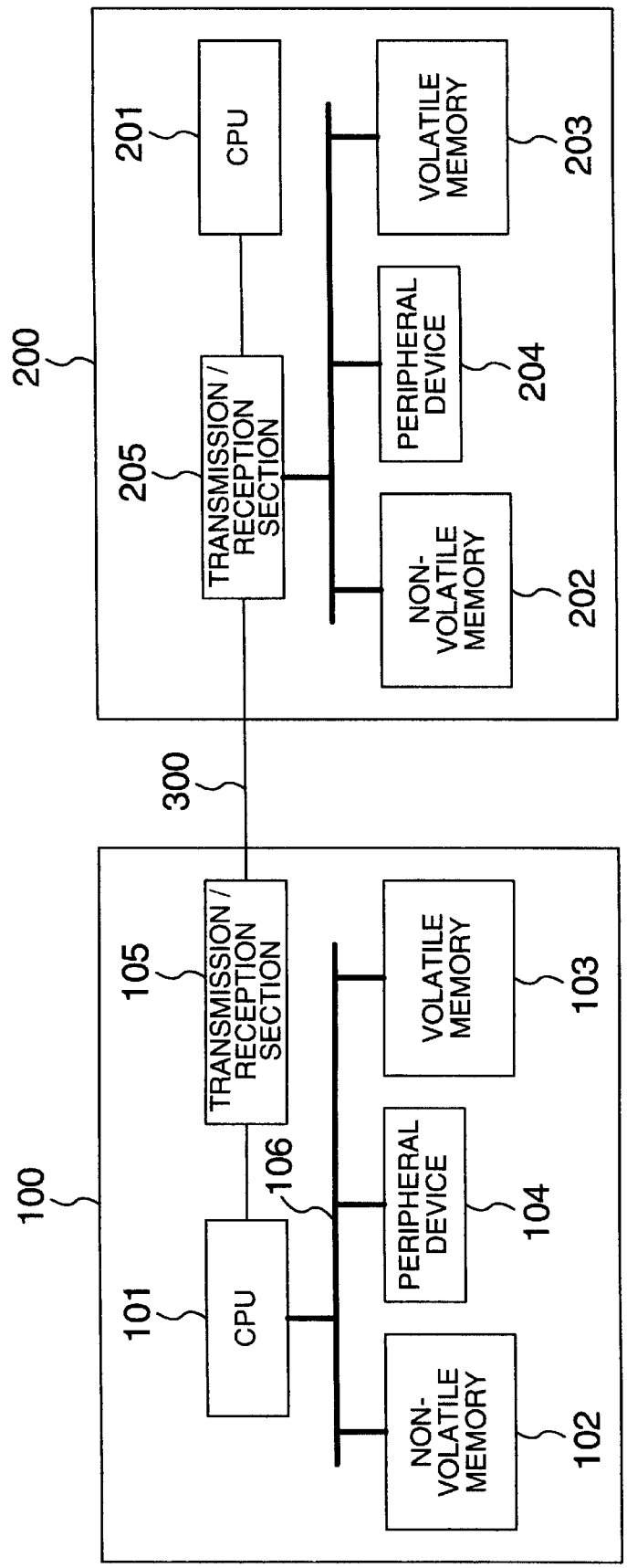
FIG. 11 is a block diagram showing configurations for a portable information terminal and host information processing apparatus proposed by the present inventors.

As connection detection circuit 510 of server 500 detects a connection between server 500 and portable music playing apparatus 400, an interrupt command enters CPU 501 through that detection signal and control processes conforming to the flowchart in FIG. 10 start. The CPU 501 first instructs bus connection circuit 511 to output signals creating connections between its own bus 506 and bus 406 of portable music playing apparatus 400 (step S11).

Next, CPU 501 reads out titles of musical compositions available from the hard disk and displays a list of titles of musical compositions on the display 520 (step S12). At this point, the list of titles of musical compositions can be displayed in categories like for example different genres or according to different artists. A user seeing this list can select music he/she wishes to transmit and input that using an input device like keyboard 530. When this is done CPU 501 reads in the selection information thus input, creates a play list (a list of titles of musical compositions for transmission) and displays this on the screen of the display 520 (steps S13, S14).

Following this, once the user looks at the play list and inputs their affirmation, CPU 501 reads out audio streams requiring transmission and decoding program(s) required for opening the streams as well as boot program(s) from the hard disk (step S15). At this time, CPU 501 is able to reference music information column D10 and detect data in program(s) required. Further even if there is no information in the music information column on compression formats, by for example referring to extensions appended to file names in the audio stream or by extracting certain audio stream characteristics, CPU 500 can detect decoding program(s) required for opening the appropriate audio stream.

Next, data for transmission processing of a data structure like that shown in FIG. 9B is produced in DRAM 503 (step S16). Thereafter transmission data in DRAM 403 of portable music playing apparatus 400 is read out, a comparison is performed with transmission data in DRAM 503 and a decision made as to whether that data identical with that already been transmitted is contained (step S17). If there is data which has already been transmitted, data besides that is read out from DRAM 503, delivered to DRAM 403 of portable music playing apparatus 400 and stored there (steps S18, S19). After that, CPU 501 reads out data from DRAM 403 of portable music playing apparatus 400 and ascertains whether or not data has been transmitted normally. If data transmission was normal CPU 501 stops processing but if data transmission was not normal there is a reversion to step S17 and re-transmission is performed (step S20).

This invention is not limited to the embodiments explained herein and a variety of changes may be made without deviating from the scope of the gist by those skilled in the art. In the embodiments described above for example, boot program(s) are transferred from a host information processing apparatus to a portable information terminal, however using a single chip microcomputer for the CPU of the portable information terminal and housing boot program(s) inside internal ROM, and having only data transferred from the host information processing apparatus to the portable information terminal or having program(s) like a decoding program described above and the required data housed inside that microcomputer is also suitable.

The above description relates mainly to situations relevant for a portable information terminal or portable music playing apparatus, however this invention is not restricted to such situations and can also be used for transmitting what would be called game software from a household game device to household game equipment for example, for enabling a game to be utilized at an external destination or for use generally in portable electronic equipment housing another microcomputer.

The embodiments of this invention as described herein realize at low-cost, portable information terminal equipment that can be smaller and lighter in addition to realizing portable information terminal for which the time required on a production and/or assembly line can be reduced.

What is claimed is:

1. An information processing system comprising:
   portable electronic equipment including a first microcomputer, a first volatile memory, a first bus connecting said first microcomputer and volatile memory and a first bus connection means for connecting said first bus to a bus of an external device; and
   an information processing apparatus including a second microcomputer, a second volatile memory, a non-volatile memory, a second bus connecting said second microcomputer, a second volatile memory and a non-volatile memory and a second bus connection means for connecting said second bus to a bus of another external device;
   wherein said portable electronic equipment is provided with a bus disconnection means enabling disconnection of the connection between said second microcomputer and said second bus so that when there is a connection through said first and second bus connection means between said first bus of said information processing apparatus and said second bus of said portable electronic equipment, said microcomputer and said bus are disconnected from each other by said bus disconnection means.

2. An information processing system according to claim 1, wherein a connection detection means is further provided for said information processing apparatus for detecting connection between said information processing apparatus and said portable electronic equipment and the configuration is such that, based on detection signals output from said connection detection means, said second bus connection means of said information processing apparatus and said first bus connection means of said portable electronic equipment are activated for mutual connection of the second and first buses.

3. An information processing system according to claim 2, wherein the configuration is such that said bus disconnection means disconnects the connection between said first microcomputer of said portable electronic equipment and said first bus based on the detection signals output from said connection detection means.

4. An information processing system according to claim 1, wherein connection detection means is further provided for each of said information processing apparatus and said portable electronic equipment for detecting connection between said information processing apparatus and said portable electronic equipment, and the configuration is such that based on detection signals output from these connection detection means, said second bus connection means of said information processing apparatus and said first bus connection means of said portable electronic equipment are each activated for mutual connection of the second and first buses.

5. An information processing system according to claim 1, wherein a power on reset circuit for detecting startup of power voltage input and generating a reset signal is further provided for said portable electronic equipment, the configuration being such that, when a connection between said information processing apparatus and portable electronic equipment is cut, a reset signal is generated from said power on reset circuit and said first microcomputer of said portable electronic equipment is reset through that reset signal.

6. An information processing system according to claim 1, wherein, when said information processing apparatus and said portable electronic equipment are connected, at least a boot program of said portable electronic equipment is transmitted via said first and second buses from said information processing equipment to said first volatile memory of said portable electronic equipment and stored therein, and when said information processing apparatus and said portable electronic equipment are disconnected from each other, said first microcomputer of said portable electronic equipment is reset through a reset signal generated by said power on reset circuit so that that first microcomputer executes a boot program stored in said first volatile memory.

7. An information processing system according to claim 1, wherein a second signal conversion circuit for converting a first signal on said second bus of said information processing apparatus into a second signal is further provided in said information processing apparatus, said second signal having a number of bits smaller than that of said first signal.

8. An information processing system according to claim 7, wherein a first signal conversion circuit for converting a third signal input to said portable electronic equipment into a fourth signal for output through said first bus is provided in said portable electronic equipment, said fourth signal having a number of bits larger than that of said third signal.

9. Portable electronic equipment comprising a microcomputer, volatile memory, a bus connecting said microcomputer and volatile memory and a bus connection means for connecting that bus to a bus of an external device, wherein said electronic equipment is further provided with a bus disconnection means enabling disconnection of the connection between said microcomputer and said bus and is configured such that, when there is a connection through said bus connection means between said bus of said external device and said bus of said portable electronic equipment, the connection between said microcomputer and said bus is disconnected through said bus disconnection means.

10. Portable electronic equipment according to claim 9, further comprising connection detection means for detecting a connection to an external device, the configuration being such that said bus connection means is activated to make a connection between said bus and a bus of said external device based on detection signals output from said connection detection means.

11. Portable electronic equipment according to claim 9, further comprising an external terminal for input of a signal controlling said bus connection means, the configuration being such that said bus connection means is activated to make a connection between said bus and a bus of said external device based on a control signal input from said external terminal.

12. Portable electronic equipment according to claim 10, wherein the configuration is such that said bus disconnection means disconnects a connection between said microcomputer and said bus based on a detection signal output from said connection detection means or a control signal output from said external terminal.

13. Portable electronic equipment according to claim 9, further comprising a power on reset circuit for detecting startup of power voltage input and generating a reset signal, the configuration being such that when a connection between an external device and said portable electronic equipment is cut, said microcomputer is reset through said reset signal generated from said power on reset circuit.

14. Portable electronic equipment according to claim 13, wherein as said microcomputer is reset through said reset signal generated from said power on reset circuit so that said microcomputer executes a predetermined program stored in said volatile memory.

15. Portable electronic equipment according to claim 9, further comprising a signal conversion circuit for converting a first signal input to said bus connection means through an external device into a second signal for output through said bus, said second signal having a number of bits larger than that of said first signal.

16. An information processing system comprising a microcomputer, volatile memory, non-volatile memory, a bus connecting said microcomputer, volatile memory and non-volatile memory, a bus connection means for connecting said bus to a bus of an external device and a connection detection means for detecting connection between said bus and a bus of said external device, the configuration being such that said bus connection means is activated to make a connection between said bus and said bus of said external device based on a detection signal output from said connection detection means; and further comprising a signal conversion circuit for converting a first signal on said bus into a second signal having a number of bits smaller than that of said first signal.

17. An information processing system comprising a microcomputer, volatile memory, non-volatile memory, a bus connecting said microcomputer, volatile memory and non-volatile memory, a bus connection means for connecting said bus to a bus of an external device and a connection detection means for detecting connection between said bus and a bus of said external device, the configuration being such that said bus connection means is activated to make a connection between said bus and said bus of said external device based on a detection signal output from said connection detection means; and further comprising a display means for making a display based on a connection signal output from said connection detection means.

* * * * *